United States Patent
Hasarchi

(10) Patent No.: US 7,460,831 B2
(45) Date of Patent: Dec. 2, 2008

(54) SYSTEM AND METHOD FOR EXCLUDING NARROW BAND NOISE FROM A COMMUNICATION CHANNEL

(75) Inventor: Abraham Hasarchi, Yavne (IL)

(73) Assignee: Dekolink Wireless Ltd., Petach Tikva (IL)

( * ) Notice: Subject to any disclaimer, the term of this patent is extended or adjusted under 35 U.S.C. 154(b) by 490 days.

(21) Appl. No.: 11/220,870

(22) Filed: Sep. 6, 2005

(65) Prior Publication Data

US 2006/0019604 A1    Jan. 26, 2006

Related U.S. Application Data

(63) Continuation-in-part of application No. 10/609,588, filed on Jul. 1, 2003, now abandoned, which is a continuation-in-part of application No. 10/175,146, filed on Jun. 20, 2002, now Pat. No. 6,873,823.

(51) Int. Cl.
*H04B 7/14* (2006.01)
(52) U.S. Cl. .............. 455/15; 455/17; 455/19; 455/20; 455/9; 455/213; 375/239
(58) Field of Classification Search .......... 455/15, 455/17, 19, 20, 9, 213, 307; 375/239
See application file for complete search history.

(56) References Cited

U.S. PATENT DOCUMENTS

| | | | |
|---|---|---|---|
| 4,598,410 | A | 7/1986 | Smith et al. |
| 5,867,535 | A | 2/1999 | Phillips et al. |
| 5,886,276 | A * | 3/1999 | Levine et al. .......... 84/603 |
| 5,930,692 | A | 7/1999 | Peterzell et al. |
| 6,151,373 | A | 11/2000 | Dodley |
| 6,161,024 | A | 12/2000 | Komara |
| 6,167,237 | A | 12/2000 | Rapeli |
| 6,336,041 | B1 | 1/2002 | Vatalaro et al. |
| 6,370,370 | B1 | 4/2002 | Roth et al. |
| 6,370,371 | B1 * | 4/2002 | Sorrells et al. .......... 455/323 |

(Continued)

FOREIGN PATENT DOCUMENTS

DE    102 53 671    8/2004

(Continued)

OTHER PUBLICATIONS

International Search Report from WO2005/004499 (PCT/IL04/00572), published Jan. 13, 2005.

(Continued)

*Primary Examiner*—Sanh D Phu
(74) *Attorney, Agent, or Firm*—EMPK & Shiloh, LLP

(57) ABSTRACT

A signal filtering system and method that may be used in conjunction with a repeater or an input stage of a base-station. The system may include an analog to digital converter adapted to sample a received signal and to produce a data stream corresponding to the received signal in the time domain, a filtering block having one or more digital filter elements, wherein each of said one or more filter elements is adapted to filter one or more sets of frequency bands associated with one or more communication channel, and a controller adapted to configure said one or more digital filter elements based on parameters stored on a database and/or based on parameters received via a modem.

35 Claims, 13 Drawing Sheets

U.S. PATENT DOCUMENTS

| | | |
|---|---|---|
| 6,445,904 B1 * | 9/2002 | Lovinggood et al. ............ 455/7 |
| 6,483,817 B1 | 11/2002 | Antonio et al. |
| 6,529,488 B1 | 3/2003 | Urs et al. |
| 6,615,021 B1 * | 9/2003 | Lovinggood et al. ........ 455/11.1 |
| 6,963,603 B1 * | 11/2005 | Rezvani et al. .............. 375/222 |
| 2001/0004586 A1 | 6/2001 | Choe et al. |
| 2002/0013131 A1 | 1/2002 | Doetsch et al. |
| 2002/0039383 A1 | 4/2002 | Zhu et al. |
| 2002/0042290 A1 | 4/2002 | Williams et al. |
| 2002/0090915 A1 | 7/2002 | Komara et al. |
| 2002/0136288 A1 | 9/2002 | McCarty, Jr. |
| 2003/0076899 A1 * | 4/2003 | Kumar et al. ............... 375/316 |
| 2003/0103560 A1 | 6/2003 | Buch et al. |
| 2003/0114103 A1 * | 6/2003 | Dinkel et al. .................. 455/17 |
| 2003/0201830 A1 | 10/2003 | Stengel et al. |
| 2004/0042557 A1 | 3/2004 | Kabel et al. |
| 2007/0064788 A1 * | 3/2007 | Yonge, III ................... 375/239 |

FOREIGN PATENT DOCUMENTS

| | | |
|---|---|---|
| EP | 0 542 520 | 3/1997 |
| EP | 0 969 601 | 1/2000 |
| RU | 2 196 384 | 1/2003 |
| RU | 2 208 294 | 7/2003 |
| WO | WO 03/001690 | 1/2003 |
| WO | WO 03/103170 | 12/2003 |

OTHER PUBLICATIONS

International Search Report from WO2004/002015((PCT/IL03/00526), published Dec. 31, 2003.

C.F.N. Cowan et al., "Adaptive Filters", Moscow, Mir, 1988, pp. 189-195, 234-241.

Search Report for Eurasian application 200601437, mailed on Feb. 11, 2007.

* cited by examiner

SYSTEM AND METHOD FOR EXCLUDING NARROW BAND NOISE FROM A COMMUNICATION CHANNEL

CROSS REFERENCE

This patent application is a Continuation-in-Part of U.S. patent applications Ser. No. 10/175,146, and Ser. No. 10/609,588, filed on Jun. 20, 2002, and Jul. 1, 2003, respectively, and each of which is hereby incorporated by reference in its entirety.

FIELD OF THE INVENTION

The present invention relates generally to the field of communications. More specifically, the present invention relates to digital filtering of one or more communication channels.

BACKGROUND

Degradation of signal-to-noise ratio ("SNR") as well as Bit energy to noise ratio ("Eb/No") or Bit energy to interference ratio ("Eb/I") or Carrier to-Interference ("C/I") ratio may occur due to interference signals that may typically appear in a communication channel with a desired received signal carried along a transmission medium (e.g. coax, unshielded conductor, wave guide, open air or even optical fiber or RF over fiber) at the receiver input. These degradations and interferences may occur in communications technologies including, for: example, CDMA, EVDO, and WCDMA, respectively operating under the 3G CDMA 2000 and UMTS standards, as well as TDMA and GSM. Signal quality attenuation and its resulting Eb/I degradation may limit bandwidth over a transmission medium. Interference from outside signals within the frequency range of a communication channel may also reduce Eb/I of the channel and reduce the amount of data the channel may carry and/or may block or saturate the communication channel receiver. In some situations, it may cause a loss of a full frequency channel. Additionally, in some situations, Eb/I degradation, e.g., due to interference signals, may render a communication (traffic or control) channel inoperative and may even degrade the base station capacity.

In order to improve the Eb/I of signals being transmitted over long distances, and accordingly to augment the transmission distance and/or data rate, signal repeaters may be placed at intervals along the transmitting path. Repeaters are well known and may be used for optical, microwave and radio frequency (RF) communication systems. Repeaters have been used as part of cellular transmission systems to extend the range of coverage between a cellular base station and a cellular handset.

However, the use of a broadband repeater (e.g., pass wide range of operating frequencies) for one or more channels at one or more frequencies within a frequency range of the spectrum ("Operating Band") (e.g. 800 MHz, 900 MHz, PCS, Public Safety, or any other network operating band) may produce noise interference to the network. Furthermore, interference signals present in the vicinity of the repeater, and within the frequency range of one of the communication channels to be repeated, may also be repeated and amplified by the repeater, effectively reducing the Eb/I of a communication channel to be repeated. Interference signals may further introduce interferences to a base station receiver that may cause, for example, a CDMA cell shrink, or may lower the base station capacity. Turning now to FIG. 1A, there is shown a spectral diagram exemplifying frequency bands or channels (e.g. 1.25 MHz each) of a first cellular operator which may be used within the frequency range of the "Operating Band" in a CDMA channel. Also shown in FIG. 1A is a narrow band interference signal of, for example, 25 KHz bandwidth, introduced by some outside source, within the frequency range of a second communication channel of the first cellular operator. The interference signals may reduce the Eb/I of one or more communication channels, and the use of a conventional repeater may serve to boost the interference signal and reduce the Eb/I of the communication channel with which it is interfering. Repeaters, as part of a Cellular network system are typically installed geographically far from base station coverage. The interference may appear in the vicinity of the repeater receiver horizon or in the vicinity of the base station receiver horizon, and may create a problem from the horizon to the base station receiver. Repeaters and/or base stations are not generally capable of solving these problems.

FIG. 1B shows a spectral diagram exemplifying possible channel frequency bands that a second cellular operator may use in the same geographic location as the first cellular operator of FIG. 1A. However, the second operator of FIG. 1B may use communication channels with a narrower bandwidth (e.g. 200 KHz) than those used by the first operator in FIG. 1A, and may also use two or more communication channels having adjacent frequency bands, to create the required traffic capability. For example, one channel may be primarily used for traffic and the other channels may be primarily used for access. All channels may generally need to be operational, so that the communication may be adequately performed. This scenario may typically occur in broader areas, e.g., between states, countries, or in areas close to water such as lakes and seas. Base stations that are installed near a water source may receive an undesired signal from far base stations or even from far countries because water is an excellent conducer of RF waves. Accordingly, as shown in FIG. 1A, the frequency bands of the operator B, e.g., the third channel in FIG. 1B, may overlap and interfere with the frequency bands of operator A, e.g., with the second channel in FIG. 1A. Additionally or alternatively, as shown in FIG. 1B, the frequency bands of the operator A, e.g., the fourth channel in FIG. 1A, may overlap and interfere with the frequency bands of operator B, e.g., with the sixth channel in FIG. 1B.

Another exemplary scenario of communication without using a repeater may occur in the context of an outdoor environment. In the outdoor environment there may be interferences in the operating base station receiver, e.g., interference signals such as TV stations or other cellular operators. These interferences may affect the base station, for example resulting in cell shrinkage and/or lower base station capacity. When a communication channel having an interference signal, e.g., as shown in FIG. 1A or in FIG. 1B, is received by a cellular base-station, the interference signal may have an adverse effect on the base station receiver. Either the receiver may not be able to extract data from the channel, or in some cases, the receiver may fully block the receiver capacity or control channel.

An interference signal may be of a fixed nature, having relatively fixed frequencies and amplitudes. Alternatively, an interference signal may be intermittent and of an unstable nature.

As should be clear from FIGS. 1A and 1B, the center frequencies and frequency-band-size of communication channels used by one or more wireless service operators/providers in a given geographic location, may vary substantially, and thus each channel may have considerably different filtering requirements when passing through a repeater and/or at the input stage of a base-station.

SUMMARY OF THE INVENTION

A system and method are provided for enabling digital filtering of communication channels, including adjusting the channels center frequencies. The system and method may enable, for example, isolating frequencies associated with individual communication channels and/or groups of communication channels, and in some cases to extracting or excluding frequencies associated with narrow band noise, or interference from a communication channel. Given the dynamic nature of noise and the possibility that a communication channel's center frequency may drift, or that a communication channel's band-size or bandwidth may either expand or shrink, the system and method may enable, for example, adjusting the channels center frequencies.

Some embodiments of the present invention relate to digital filtering of one or more communication channels to facilitate the operation of a repeater, by filtering communication signals received at the base-station, and/or by excluding narrow band noise/interference either at a base-station or at a repeater.

Some embodiments of the present invention relate to a receiver that may receive a signal associated with a certain communication channel at a specific frequency. An analog to digital converter may generate a digital signal correlated to the received signal and the digital signal may be passed though a digital filter, configured to filter the digital signal and pass frequency components at or around the frequency of the communication channel's specific frequency. A digital to analog converter may generate an analog signal correlated to the filtered digital signal. In some embodiments of the present invention, the analog signal may be passed or inputted directly or indirectly into a base station receiver. In other embodiments of the present invention, a transmitter may retransmit the analog signal either to a base station, a handset or to a repeater.

According to some embodiments of the present invention, there may be included a second digital filter configured to pass frequency components, at, or around a second frequency associated with a second communication channel.

According to some embodiments of the present invention, there may be included a down-converter to down-convert a received signal to an intermediate frequency signal. Alternatively, the down converter may down convert the received signal to a desired radio frequency signal. Additionally or alternatively, an up-converter may be included to up-convert to a transmission frequency an analog signal correlated to the filtered digital signal.

According to some further embodiments of the present invention, a digital filter may be configured to filter out an interference signal. The digital filter may either be a notch filter or a combination of two filters having partially overlapping band pass characteristics.

According to some further embodiments of the present invention, a control unit may program the first and/or second digital filters according to digital filter parameters and/or coefficients, stored in a filter parameter database. The controller may also receive digital filter parameters and/or coefficients from a remote location through a modem.

The control unit may receive signals from one or more performance monitors of a system according to present invention indicating performance parameters, such as signal delay, phase shift, gain, and presence of noise/interference. In response to the performance monitor signals, the controller may adjust or change the digital filter parameters and/or coefficients of one or more digital filter in order to bring system performance within operational requirements.

According to some further embodiments of the present invention, the digital signal, either before or after filtering, may be mixed with a digital sinusoidal signal at a shifted frequency Fshift. The shifted frequency may be set and adjusted by the controller, either in response to performance monitor signals or based on instructions received through a modem.

According to some further embodiments of the present invention, an analog signal produced by the digital to analog converter may be provided to the input of a base station receiver.

According to some further embodiments of the present invention, one or more of the filter elements may include a time domain to frequency domain conversion engine, a frame shaping unit, and a frequency domain to time domain conversion engine. The frequency domain conversion engine and the method to operate the engine may provide capabilities to monitoring the communication channel traffic and may enable to detect interferences characteristics. The data on the existing interference and its characteristic may give a tool, for example, to a customer, to decide if the communication channel is damageable from the interference.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
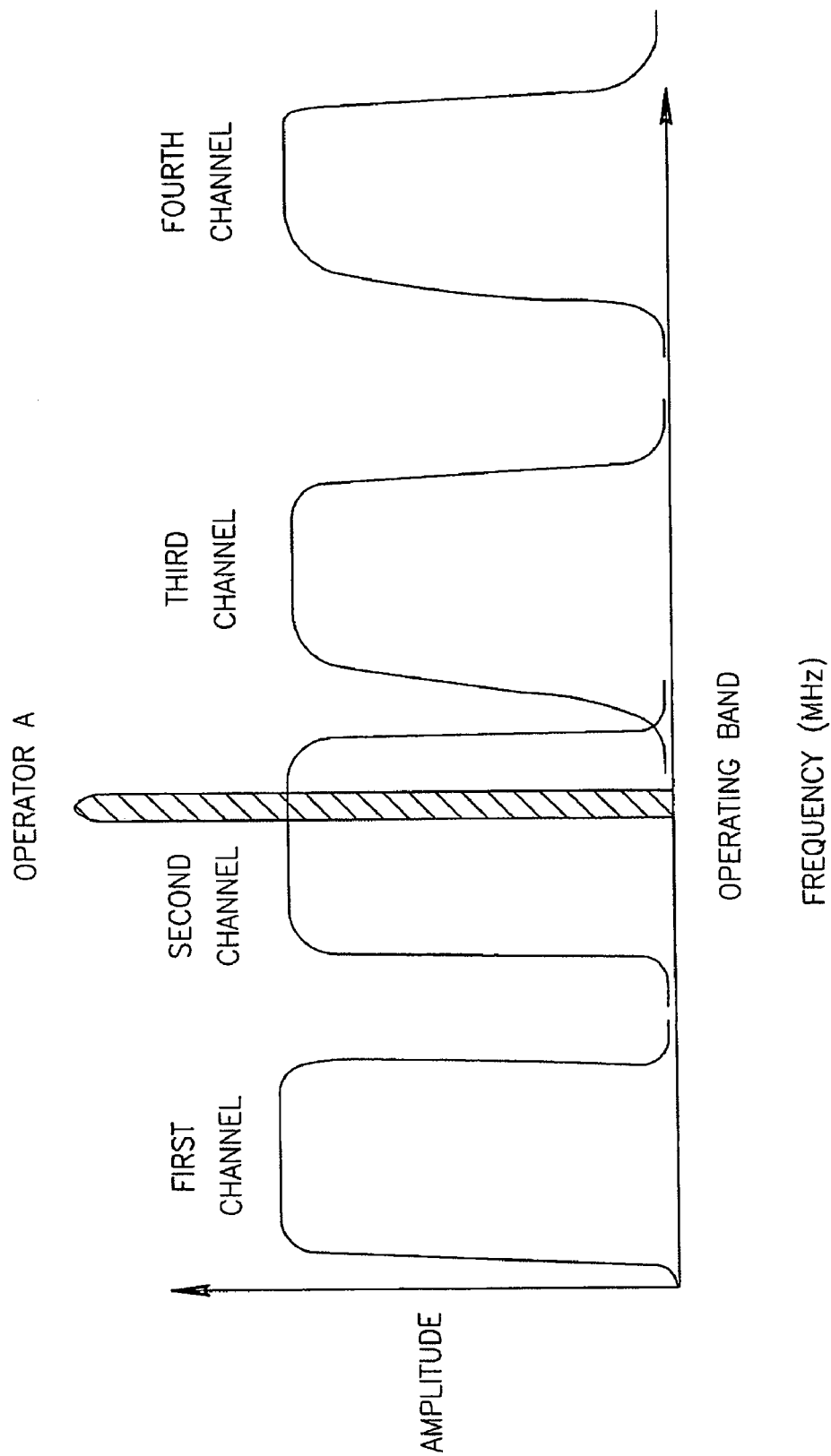
FIG. 1A is a spectral diagram showing four multi-frequency signals of four, respective, communication channels, which may be used by a cellular operator in a specific geographic region, where the second communication channel is corrupted by an interference signal.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic quantities within the computing system's registers and/or memories into other data, similarly represented as physical quantities within the computing system's memories, registers or other such information storage, transmission or display devices.

Embodiments of the present invention may include apparatuses for performing the operations herein. Such apparatuses may be specialty constructed for the desired purposes, or they may be implemented using a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 2A:
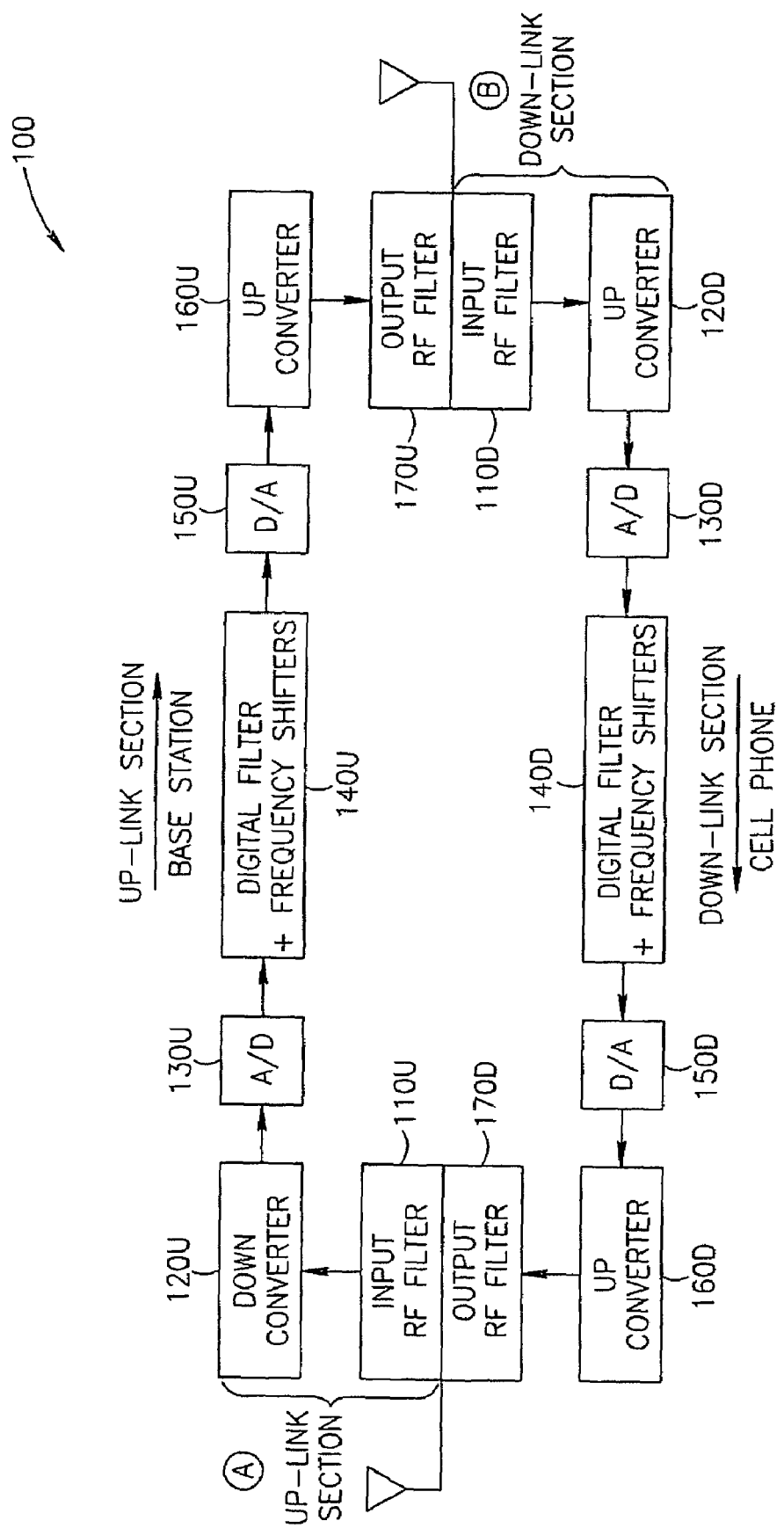
FIG. 2A is a block diagram showing an example of a bi-directional repeater with digital filters and digital frequency shifters according to some embodiments of the present invention.

Turning now to FIG. 2A, there is shown a block diagram of a bi-directional repeater 100 with a digital filters and digital frequency shifters block 140U according to some embodiments of the present invention. The bi-directional repeater 100 may include two basic sections: (A) an upstream or up-link section which receives signals from a mobile device (e.g. cell phone) and retransmits the signal to a base-station; and (B) a downstream or down-link section which receives signals from either a base-station or an upstream repeater, and retransmits the signals to a mobile device or to a downstream repeater.

Looking first at the up-link section (A) from left to right in FIG. 2A, there may be an input filter 110U, which for this example, may be a radio frequency ("RF") filter, or more specifically, may be a filter tuned to pass frequencies in the range of an Operating Band, e.g., 800 to 830 MHz. The input RF filter 110U may receive signals from an antenna and may pass frequencies in the frequency range of one or more communication channels to be repeated to a down converter 120U. The down converter 120U may mix a received signal with a sine or cosine signal of a given frequency such that the received signal may be down-converted to an intermediate frequency ("IF") signal. Alternatively, the received signal may be down converted directly to the desired RF signal. Either or both of the input RF filter 110U and the down converter 120U may include a signal amplifier (not shown in FIG. 2). An analog to digital ("A/D") converter 130U may sample, e.g., at the rate of 60 M Samples/Sec, the IF signal and may generate a digital signal representing the sampled IF signal. The digital signal representing the IF signal may enter digital filter and frequency shifter block 140U.

Figure 3:
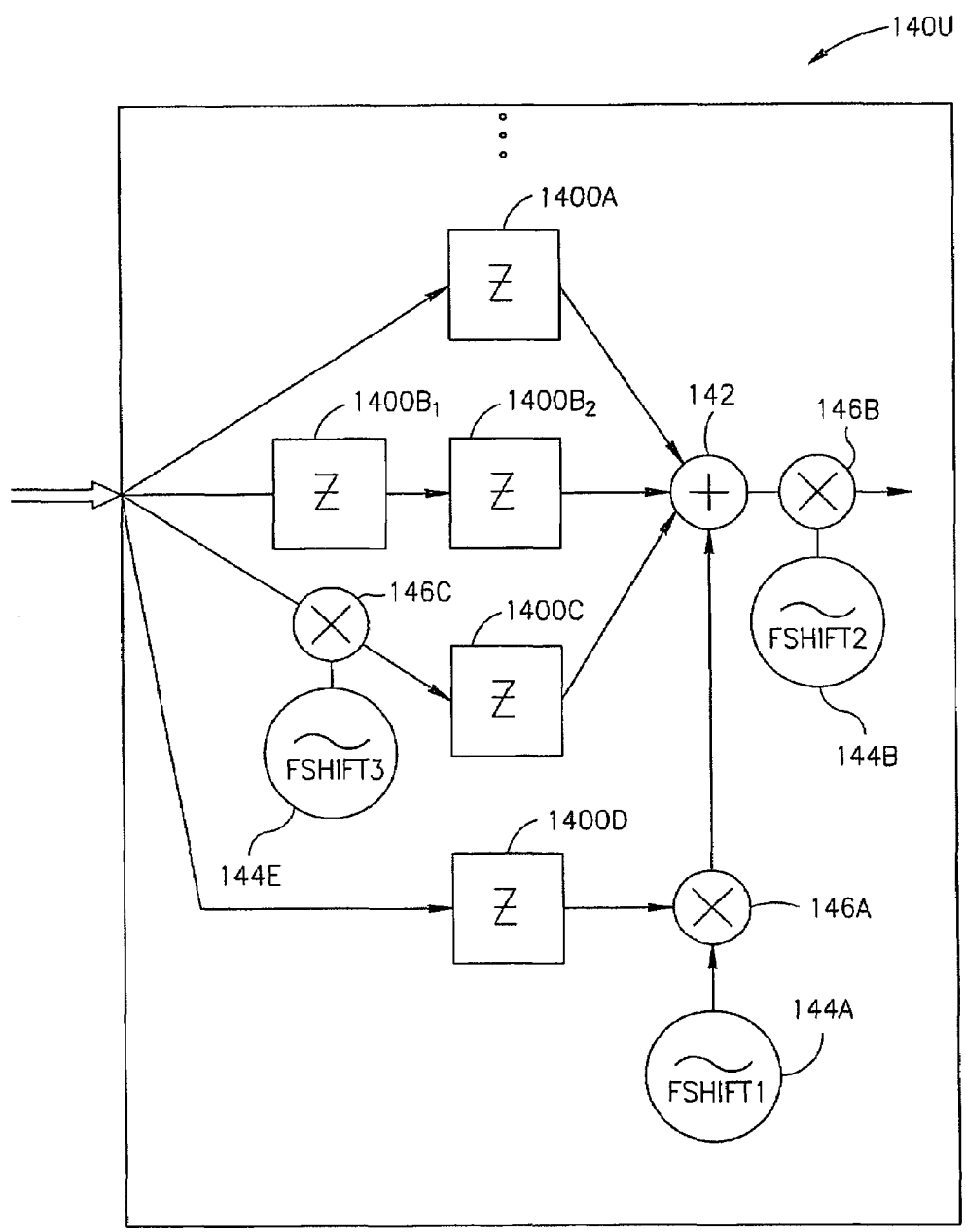
FIG. 3 is a block diagram showing one possible embodiment of the digital filters and frequency shifters block of FIG. 2A.

Turning now to FIG. 3, there is shown a block diagram of an exemplary embodiment of a digital filter and frequency shifter block 140U, including, for example, digital filters 1400A to 1400D, mixers 146A and 146B, and digital sinusoidal generators 144A and 144B. The frequency shifter implemented in the digital filter and frequency shifter block 140U may be digital. A digital signal entering block 140U may be filtered by each of a plurality of digital filters 1400A through 1400D and the output of each of the digital filters may be combined by an adder 142 or by a functionally equivalent device. Each of the filters within the digital filter 140U may have a separate and distinct, e.g., independently defined, frequency response. Digital filters 140U and/or 140D may include any number of digital filters and/or combination of filters, and the four digital filters 1400A to 1400D in FIG. 3 are described only as an example.

Digital filters are well known in the field of communications. Implementation of a digital filter bank may be performed using a single processor or multiple processors, e.g., a digital signal processor ("DSP"), or may be implemented on a single or multiple dedicated digital filtering circuits, e.g., field programmable digital filters. In the example of FIG. 3, there are shown five discrete digital filter circuits. As part of some embodiments of the present invention, digital filters 1400A through 1400D may be field programmable digital filters ("FPDF"). That is, each filter's transfer function, along with its frequency response, may be programmed, reprogrammed or adjusted, as required.

Figure 1B:
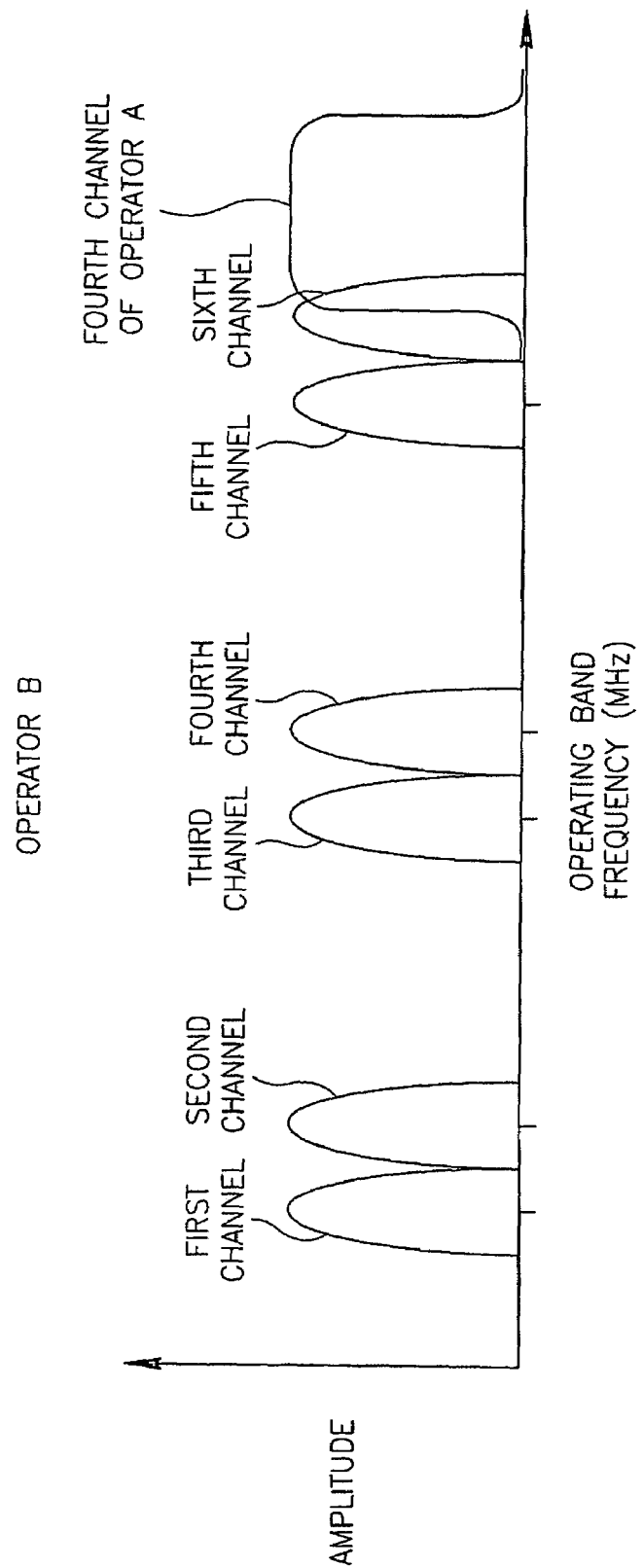
FIG. 1B is a spectral diagram showing five multi-frequency signals of five, respective, communication channels, which may be used by a second wireless service provider/operator in a specific geographic region, where the communication channels are of a smaller bandwidth than those of FIG. 1A and wherein two pairs of channels are adjacent to one another.
Figure 4A:
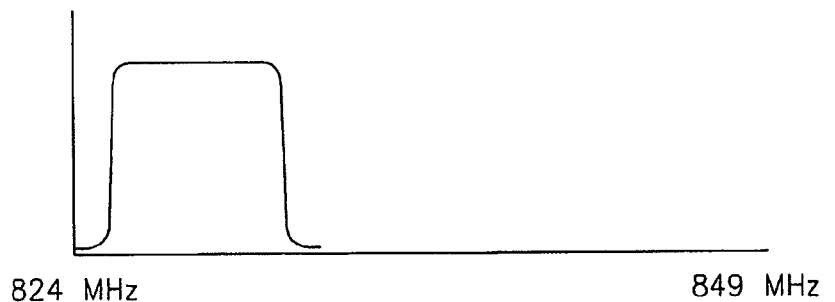
FIGS. 4A to 4C are spectral diagrams showing examples of frequency responses of digital filters 1400A through 1400D in FIG. 3.
Figure 4B:
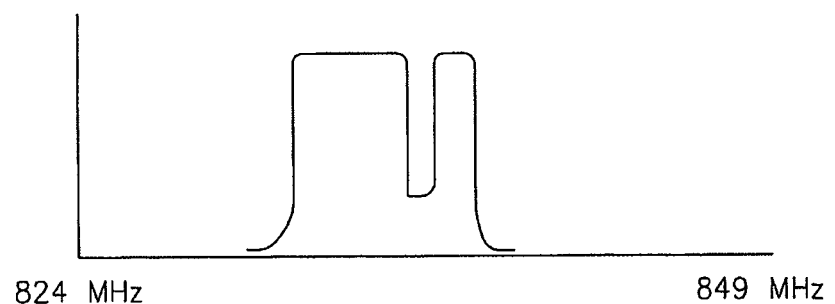
Figure 4C:
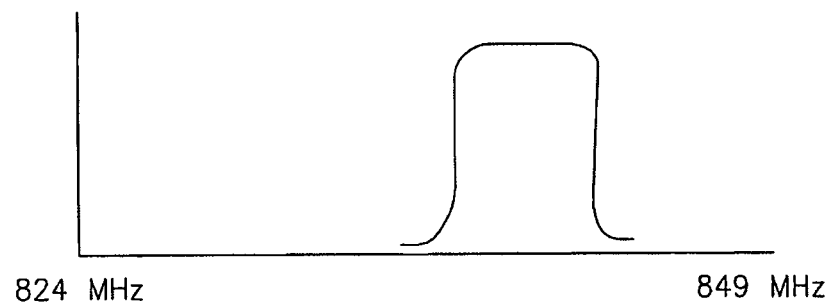

Turning now to FIGS. 4A through 4C, there are shown examples of possible frequency responses for digital filters 1400A through 1400D of FIG. 3, where digital filters 1400A through 1400D may correspond to the first through the fourth communication channels exemplified in FIG. 1A, respectively. That is, the impulse response or frequency transfer characteristic for each digital filter 1400A through 1400D may be separately set or adjusted to pass frequency components of digital signals that are at or around the carrier/center frequency of the filter's corresponding communication channel. For example, digital filter 1400A may be programmed with a transfer function having a band pass frequency response peaking at or around the carrier frequency of the first communication channel shown in FIG. 1A. Digital filter 1400C may be programmed with a transfer function having a band pass frequency response peaking at or around the carrier/center frequency of the third communication channel shown in FIG. 1B, and may have a bandwidth smaller than that of filter 1400A, since the channels shown in FIG. 1B are narrower than those shown in FIG. 1A.

Digital filters $1400B_1$ and $1400B_2$ of FIG. 3 may be arranged in series and each may be programmed to have a partially overlapping band-pass frequency response with the other, as shown in FIG. 4B. An application of the resulting frequency response of the combined filters may be the exclusion of interference signals such as the one shown in the second channel of operator A in FIG. 1A. If an interference signal is present within a communication channel's frequency band, the filters may be configured to produce a frequency response having two sub-bands or a notch or stop band, at or around the frequency of the interference signal. For example, as shown in FIG. 1A, a communication channel (second communication channel) may have frequency components between, for example 824 Mhz and 849 Mhz (known as the cellular frequency band), and an interference signal, e.g., a television signal from a neighboring country, may have a frequency band of, for example, 839 Mhz to 840 Mhz. The filters $1400B_1$ and $1400B_2$ may be configured to produce a frequency response to pass most of the frequency components between the cellular frequency band and to exclude or suppress frequency components between, for example, 839 Mhz to 840 Mhz, thereby stopping the interference signal from propagating through the digital filter 140U and being repeated or retransmitted. Numerous filter designs, e.g., a notch filter, a stop band filter, a two sub-bands filter, or any other suitable filter and/or combination of filters may be used to produce a selected frequency response. For example, the selected frequency response may have the property of passing most of the frequency components of a communication channel, and suppressing, or excluding frequency components of an interference signal within the frequency band of the communication channel. Thus, the frequency response to an interference signal may be based on a predetermined, e.g., anticipated interference pattern, such as but not limited to a television signal from a neighboring country, or in response to an actual received interference signal, e.g., a temporary random signal, which may not be known in advance.

The physical design of digital filters having desired transfer functions is well known in the art. Although specific filters and transfer functions are mentioned above, any digital filter and transfer function combination, currently known or to be devised in the future, may be used as part of the present invention. Furthermore, the digital filter or filters may include ASIC's and FPGA's and/or a DSP engine which are well known in the art, and which may be reprogrammed in response to a shift in the frequency composition of an interference signal. That is, if the frequency band of the interference signal changes, the digital filter or filters may be reprogrammed, manually or automatically, to shift the notch or stop band region to correspond with the interference signal's frequency band. Notch filters performance may be changed to optimize the channel performance. Such optimization of the channel performance may be achieved, for example, by reprogramming and/or modifying various parameters, e.g., the filter bandwidth, attenuation, delay, by modifying the filter slops, or by providing linear phase, and minimum in/out band delay variation etc.

Figure 4D:
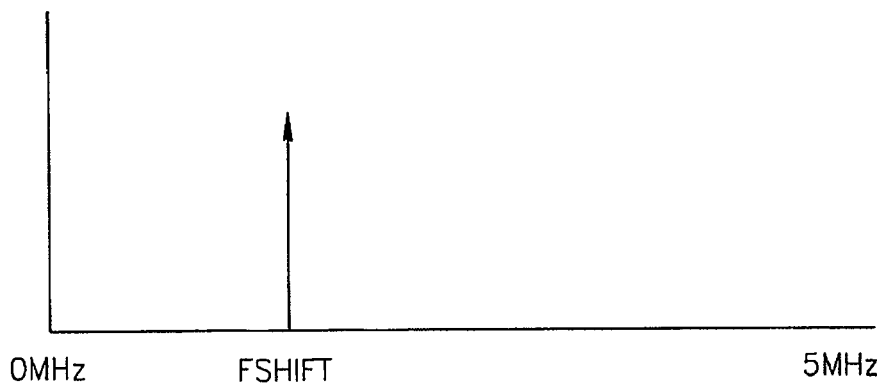
FIG. 4D is a spectral diagram showing an example of a frequency domain representation of a digital sinusoidal signal at a shifted frequency.
Figure 4E:
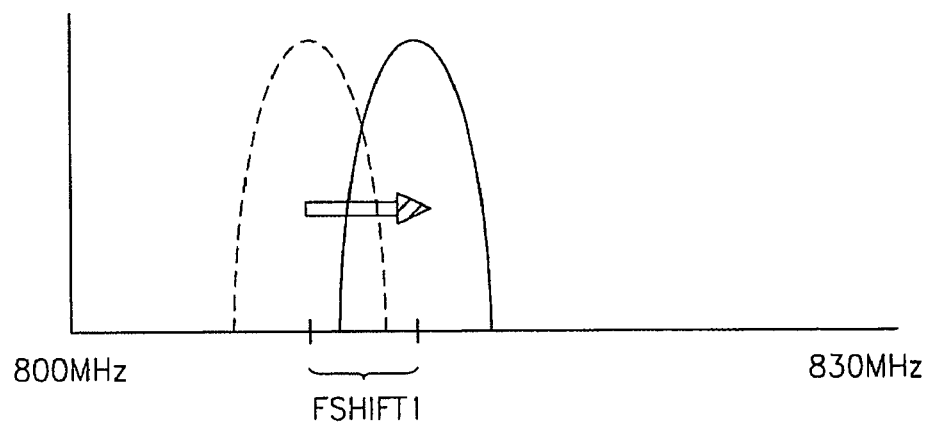
FIGS. 4E and 4F are spectral diagrams showing examples of frequency shifted communication channels.
Figure 4F:
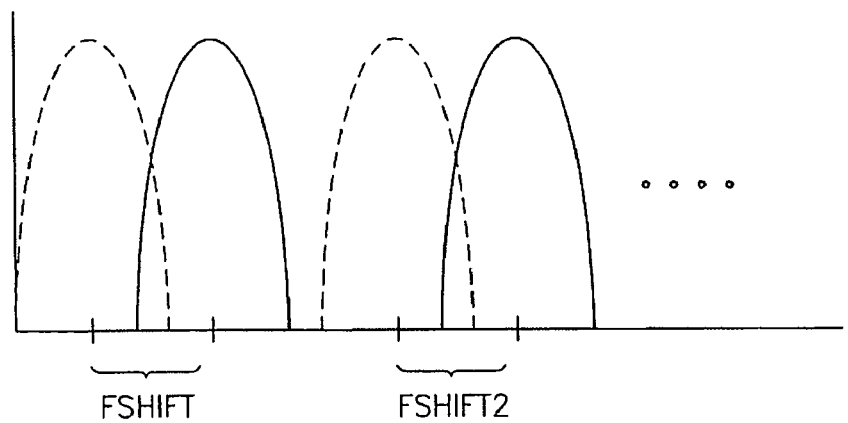

Also shown in FIG. 3 are three digital frequency-shifting units. The first frequency-shifting unit may include, for example, a digital sinusoidal signal generator 144A to produce a digital sinusoidal signal, e.g., a numerical control oscillator, at a shifted frequency $F_{shift1}$, and a digital mixer 146A to mix the digital sinusoidal signal with an output of a digital filter, e.g., digital filter 1400D. The second frequency shifter unit may include a digital sinusoidal signal generator 144B to produce a digital sinusoidal signal at a shifted frequency $F_{shift2}$, and a digital mixer 146B to mix the digital sinusoidal signal with the output of digital signal adder 142. The third frequency shifter unit may include a digital sinusoidal signal generator 144C to produce a digital sinusoidal signal at a shifted frequency $F_{shift3}$, and a digital mixer 146C to mix the digital sinusoidal signal with an input to a digital filter, e.g., 1400C. Signal shifting units may shift the frequency of the signals to which they are applied by the frequency of the digital sinusoidal signal produced by their respective digital sinusoidal generators. FIG. 4D shows a spectral diagram of a digital sinusoidal signal, which digital sinusoidal signal appears as an impulse at the frequency of the signal ($F_{shift}$). FIG. 4E shows a spectral diagram depicting a shift in the frequency components of a single communication channel, as may result from the application of a frequency shifter to the either the input or output of a digital filter 140. FIG. 4F shows a spectral diagram depicting a shift in the frequency components of several communication channels, as may result from the application of a digital frequency shifter to the output of digital signal adder 142.

Generally, mixing a digital signal with a digital sinusoidal signal may result in shifting of the frequency components of the digital signal by the frequency of the sinusoidal signal. The shift may be both up and down in frequency, and harmonics may also be produced by the process. Thus filters may be used to isolate the desired frequency band. Digital filters may be used to remove harmonics from the output of mixers 146A and 146A, if desired.

Now turning back to FIG. 2A, there is shown, directly after the digital filter and frequency shifter block 140U, a digital to analog converter ("D/A") 150U. The D/A 150U may convert the digital signal output of the block 140U to an analog signal, which may then be up-converted by up-converter 160U to the original frequency received at input RF filter 110U. An output filter 170U may be used to remove harmonics that may have been introduced into the signal by the up-converter 160U.

Either or both of the up-converter 160U and the output RF filter 170U may include a signal amplifier (not shown in FIG. 2A). The filtered signal may then propagate to and out of a transmission antenna.

The downstream or down-link (B) section of the bi-directional repeater 100 may substantially mirror the up-stream section (A) discussed above. One difference may be that the input RF filter 110D, digital filters and digital frequency shifter block 140D and output RF filter 170D may be tuned to receive and pass frequencies of downstream communication channels, as opposed to passing frequencies at or around upstream communication channels.

The specific frequency bands to which each of the filters is set may depend on the specific frequencies of the communication channels, upstream and downstream, that an operator may wish to repeat within a specific geographic location. The frequencies shown in FIGS. 1A and 1B are only examples of such communication channel frequencies. No distinction is made between upstream and downstream channels in FIG. 2A. However, it will be understood by one of ordinary skill in the art that in a cellular system, or any other two-way wireless communication system, there may be a corresponding upstream communication channel for each downstream communication channel. The relation between an upstream channel frequency and a downstream channel frequency may be fixed, or each may be negotiated or set separately between a mobile device and a base station.

Figure 2B:
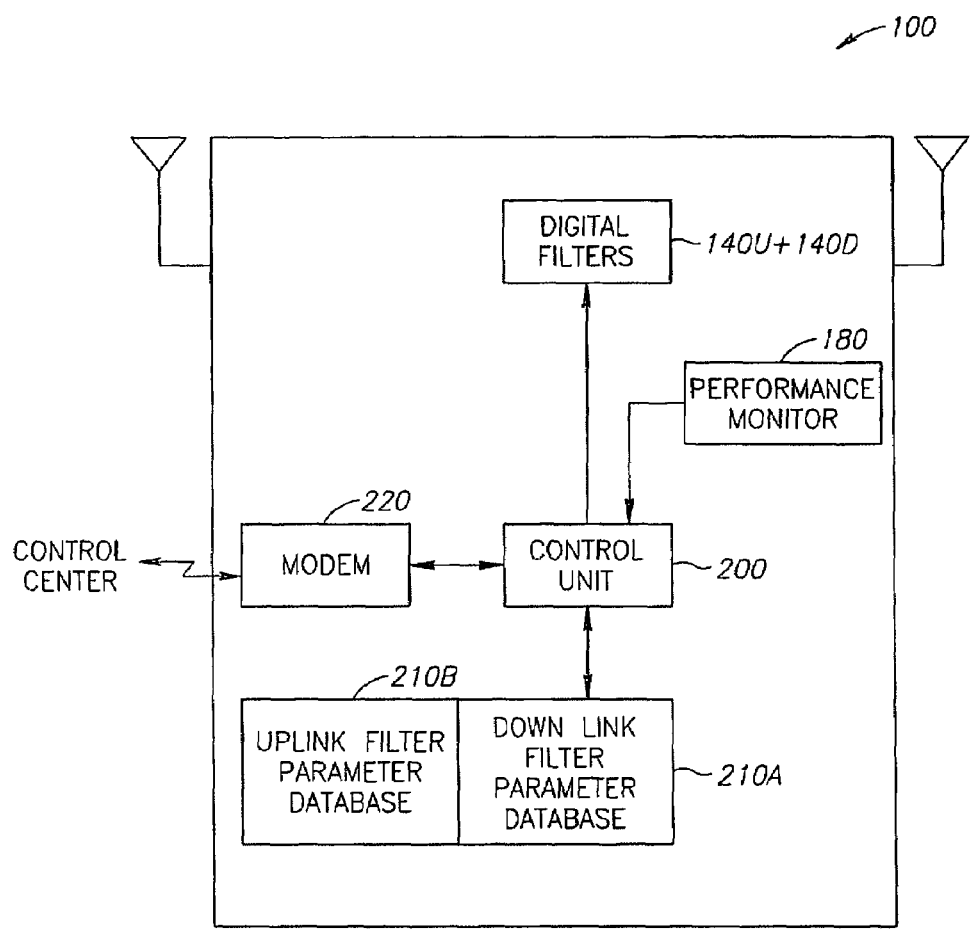
FIG. 2B is a block diagram showing an example of a bi-directional repeater with digital filters, a control unit, a performance monitor, and a modem according to some embodiments of the present invention.

Turning now to FIG. 2B, there is shown a block diagram of an embodiment of the present invention including a control unit 200 connected to digital filters 140U and 140D and receiving performance data from a performance monitor 180. The control unit 200 may program and/or adjust configurations, parameters, and consequently filtering characteristics, of each of the digital filters 1400A to 1400D (shown in FIG. 3) within either of the digital filters 140U and 140D. The control unit 200 may program or adjust each digital filter 1400A, 1400B, 1400C, or 1400D based on parameters stored in parameter databases 210A and 210B, based on instructions received remotely (e.g., via modem or other external source), or in response to performance signals received from a performance monitor 180.

According to some embodiments of the present invention, the control unit 200 may program or adjust the parameters and/or digital filter coefficients of a specific digital filter 1400A, 1400B 1400C, or 1400D, or digital filters 140U and 140D, collectively, in order to accommodate operational or performance requirements associated with a specific communication channel or set of communication channels. For example, the control unit 200 may program one of the digital filters 1400A-1400D corresponding to the frequency band of the first communication channel in FIG. 1A. Thus, the control unit 200 may produce or generate a digital filter 1400A, 1400B, 1400C, or 1400D with a digital filter configuration and coefficients resulting in band pass frequency response characteristics consistent with the center frequency and bandwidth of the first communication channel in FIG. 1A. The control unit 200 may program or adjust a second digital filter with a configuration and coefficients to produce a second digital filter 1400A, 1400B, 1400C, or 1400D having band pass frequency response characteristics consistent with the center frequency and bandwidth of the second communication channel in FIG. 1A, and having a notch in the band pass region.

Likewise, within the same digital filters, 140U or 140D, as within the first and second digital filters mentioned directly above, the control unit 200 may program a third digital filter to filter either a single narrowband communication channel, e.g., the fifth channel shown in FIG. 1B, or a set of adjacent narrowband channels, e.g., the third and fourth communication channels shown in FIG. 1B. Each digital filter 1400A-1400D may be programmed with a unique and independent configuration and coefficients and may have a frequency response completely independent from those of any of other filters in either digital filter 140U or 140D.

The control unit 200 may adjust a filter's configuration and/or coefficients in response to signals from the performance monitor 180. Performance monitor 180 may monitor parameters such as signal delay, phase shift, and gain across the one or more filters and/or one or more other components of a system according to embodiments of the present invention. For example, if the performance monitor indicates to the controller that signal delay, phase shift, and/or signal loss across one of the filters 1400A-1400D exceeds a threshold value, the control unit 200 may adjust or change the digital filter's configuration to compensate accordingly. In general, complex filter configurations may provide more well defined and enhanced filtering parameters than relatively simpler configurations; however, such enhanced parameters may be obtained at the expense of time delays and phase shifts across the filter. Therefore, according to some embodiments of the present invention, if control unit 200 determines that a particular filter 1400A to 1400D has an excessive delay and/or phase shift, the controller may reprogram or adjust that particular filter to a simpler configuration. Such reprogramming may be implemented manually and/or automatically. Although simpler filter configurations may produce poorer characteristics, such as smaller, less defined slopes on the edges of the filter's band, the delay and/or phase shift values of such configurations may be improved significantly. In another example, the control unit 200 may program digital filter 1400A, 1400B, 1400C, or 1400D to have a bandwidth sufficient to pass frequency components of multiple adjacent communications channels, for example, the third and fourth channels in FIG. 1B. It will be appreciated that in certain operational situations, such as when two communication channels are filtered using one digital filter 1400A, 1400B, 1400C, or 1400D, it may be beneficial to adapt the configuration and coefficients of the digital filter so as to have a wider band pass region and/or shorter and less defined slopes.

It should be clear to one of ordinary skill in the art that the control unit 200 may dynamically alter the configurations and coefficients of any of the filters 1400A-1400D, based either on data stored in databases 210A and 210B, or on data received from a remote source, for example, via modem 220, or on a combination of both. Database 210A may store data related to downlink conversion and database 210B may store data related to uplink conversion. For example, the controller may receive an instruction through the modem 220 to reconfigure the bandwidth of a filter currently configured to pass only one communication channel, to now pass two communication channels. The control unit 200 may be instructed to reconfigure filters based on data in the databases 210A and 210B and/or may be provided with the new configuration and coefficients via modem 220. Furthermore, new filter configuration and coefficient data may first be uploaded to databases 210A and 210B from a remote source, for example, via modem 220, following which control unit 200 may receive an instruction to reconfigure filter 1400A, 1400B, 1400C, and/or 1400D based on the new data. In another embodiment of the present invention, performance monitoring data from the performance monitor 180 may be sent to control unit 200 via modem 220.

Figure 8:
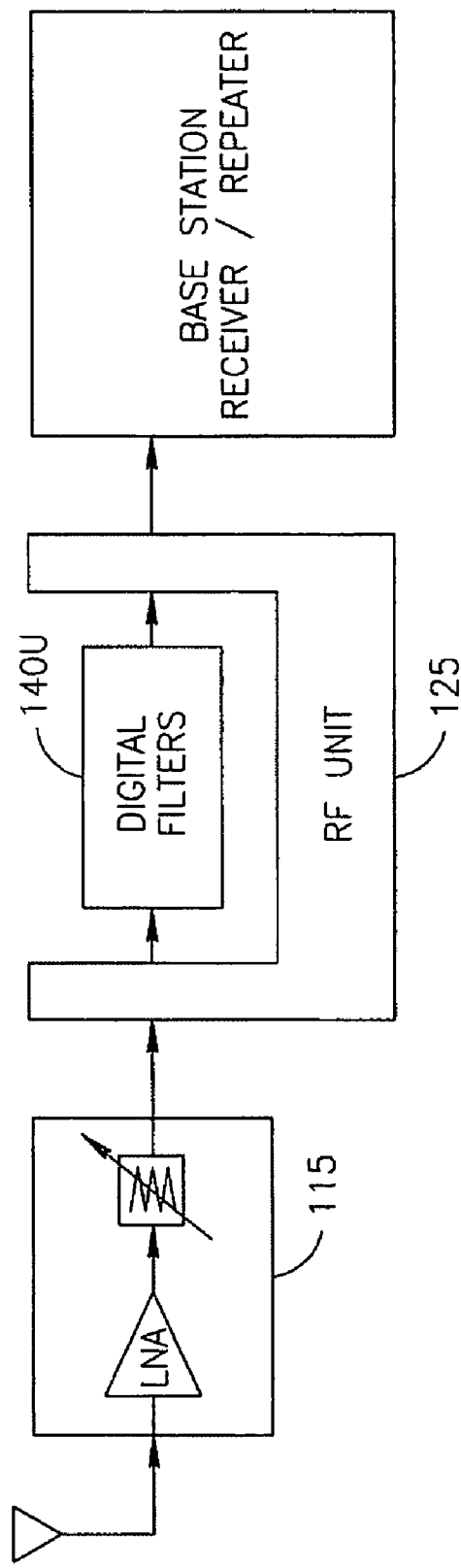
FIG. 8 is a block diagram showing a communication channel with digital filtering system and or frequency shifting, which may be combined, for example, with a Tower Mounted Amplifier (TMA) or Tower Top Amplifier (TTA) in front of a base station front end according to some embodiments of the present invention configured to operate in conjunction with a base station.

Turning now to FIG. 8, there is shown an embodiment of the present invention suitable as an input stage to a conventional cellular base station, a conventional repeater, or any other communication system with a receiver. In the embodiment shown in FIG. 8, there may be a pre-filtering stage 115 which may include, for example, a low noise amplifier ("LNA") and attenuator. A RF unit 125 may contain a down converter and may down convert the output of the pre-filtering block to an intermediate frequency ("IF") signal. An A/D converter (not shown) may be included in the RF unit 125 or in a digital filter block 140U. The down converted signal may be converted into a digital signal by the A/D converter, and the digital signal may be filtered by digital filters in the digital filter block 140U as described above (see also up link section A in FIG. 2A, FIG. 3 and FIGS. 4A-G).

One of ordinary skill in the art should understand that down converting of the analog signal to an intermediate frequency may not be required if an A/D converter having a sufficiently high sampling rate is used. Typically, in order to get an accurate digital representation of an analog signal, a sampling rate of twice the highest frequency component in the analog signal is required. Thus, down converting to an intermediate signal may allow for the use of a slower and cheaper A/D converter, however, it is not essential.

Once a digital signal representing the received analog signal is produced, filtering of interference signals and frequency shifting of communication channels may be performed as described above with reference to FIGS. 3 and 4A to 4F. The digital filters 1400A, 1400B, 1400C, or 1400D, may be configured to produce any one of a number of transfer characteristics or frequency responses, including notch filtering of a narrow band interference signal.

Once filtered, the digital signal may be converted back into an analog signal using a D/A converter (not shown). The output of the D/A converter may be up converted, if a corresponding down conversion step was previously used, e.g., before digitizing the signal. The D/A converter may either be part of the digital filters block 140U or part of the RF unit 125. The up converter, if used, may be part of the RF unit 125.

The analog output of the above described embodiment of the present invention may be supplied to an RF input stage of a conventional base station, as shown in FIG. 8, or to the input stage of a conventional repeater, or to any other receiver used as part of a RF communication system.

Figure 5A:
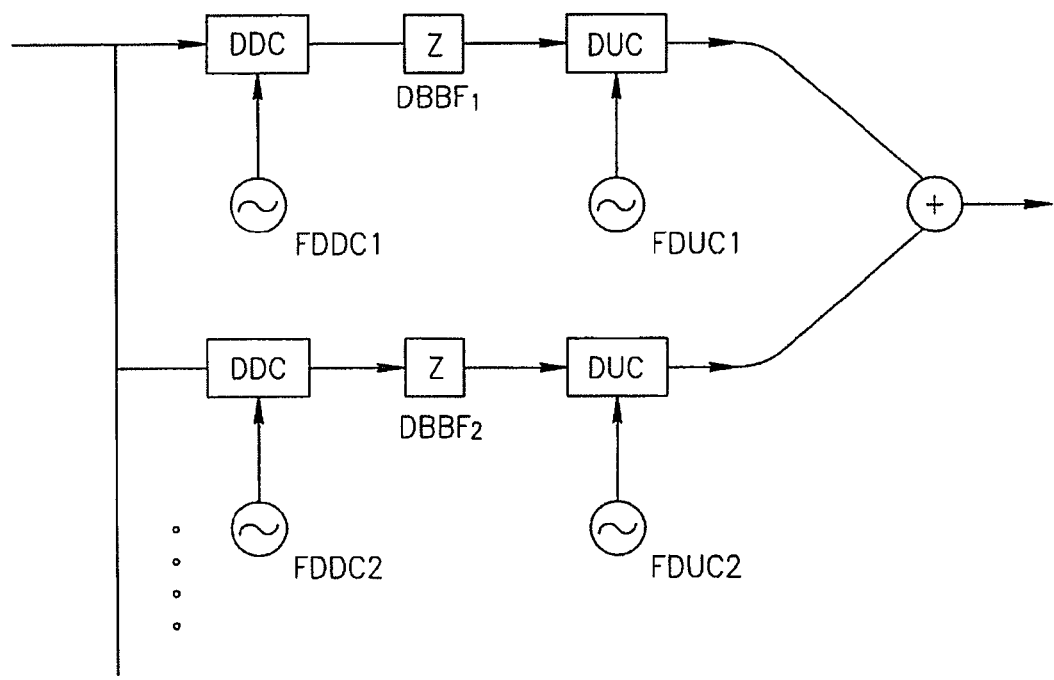
FIG. 5A shows a block diagram of a multiple-channel digital filtering configuration or block according to some embodiments of the present invention.
Figure 5B:
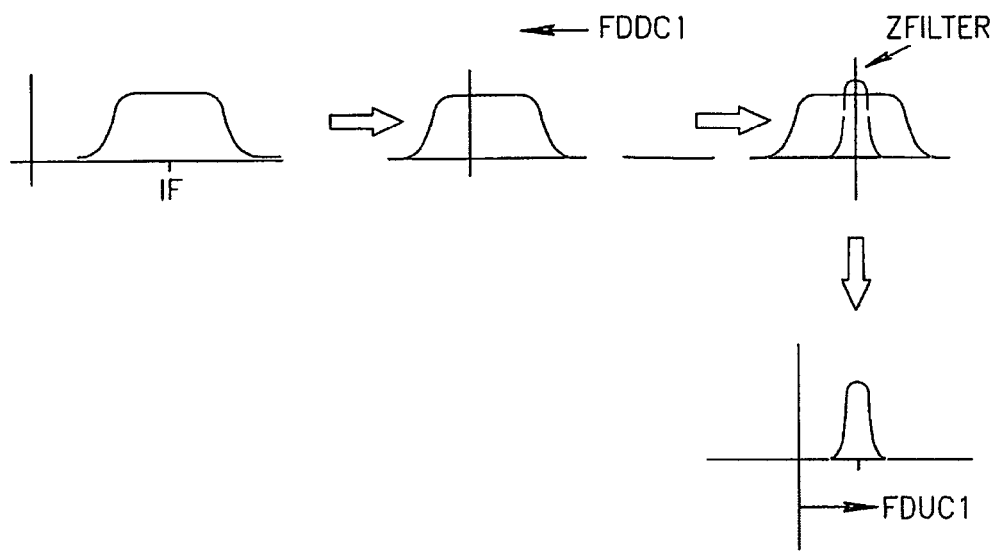
FIG. 5B is a series of spectral diagrams illustrating exemplary effects on a signal by elements in the uplink path of the multiple-channel digital filtering block of FIG. 5A.
Figure 5C:
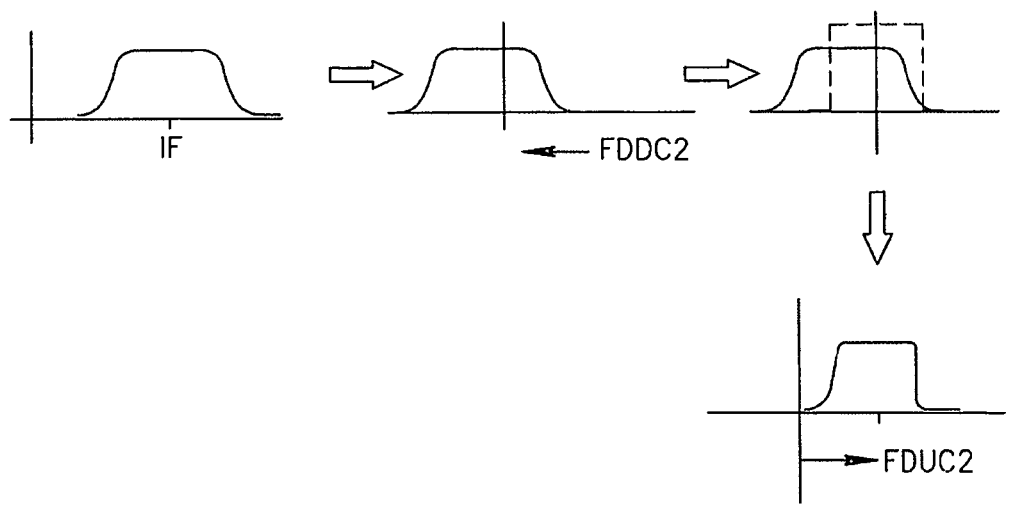
FIG. 5C is a series of spectral diagrams illustrating exemplary effects on a signal by elements in the downlink path of the multiple-path digital filtering configuration of FIG. 5A.

Turning now to FIG. 5A, there is shown a block diagram of a multiple-path digital filtering configuration of block 140U of FIG. 8 according to some embodiments of the present invention. The filtering configuration of FIG. 5A may have multiple parallel signal paths where each signal path may induce multiple filtering elements. The first and second signal paths may include a digital down converter, a base band digital filter, and digital up converter. Reference is made to FIG. 5B which shows a series of spectral diagrams illustrating exemplary effects on an input signal by elements in the top path of the multiple-path digital filtering block of FIG. 5A and to FIG. 5C, which shows a series of spectral diagrams illustrating exemplary effects on an input signal by elements in the lower path of the multiple-path digital filtering block of FIG. 5A. As shown in FIGS. 5B and 5C, a digital down converter may shift downward the frequency components of a digital signal, e.g., by a frequency of a first digital sinusoidal signal ($F_{DDC}$) provided by a first digital sinusoidal source. According to some embodiments of the present invention, a digital base-band filter may be used to filter the down-converted or down-shifted digital signal, and a digital up converter may up-convert or shift up the frequency band of the output of the digital base-band filter by a frequency of, e.g., a digital sinusoidal signal ($F_{DUC}$) provided by either the first or second digital sinusoidal source.

According to some embodiments of the present invention, each digital down converter and each digital up converter may be associated with a separate digital (e.g., sinusoidal) signal source, wherein each of the digital signal sources may be individually controlled to provide a separate digital signal of any frequency within the source's operating range. Each of the base stations band digital filters may be programmed with a separate configuration and/or filter coefficients. According to some embodiments of the present invention, the digital converters, digital up converters, their associated digital sources and each digital base band filter may be individually adjusted or controlled by control unit 200.

Figure 6A:
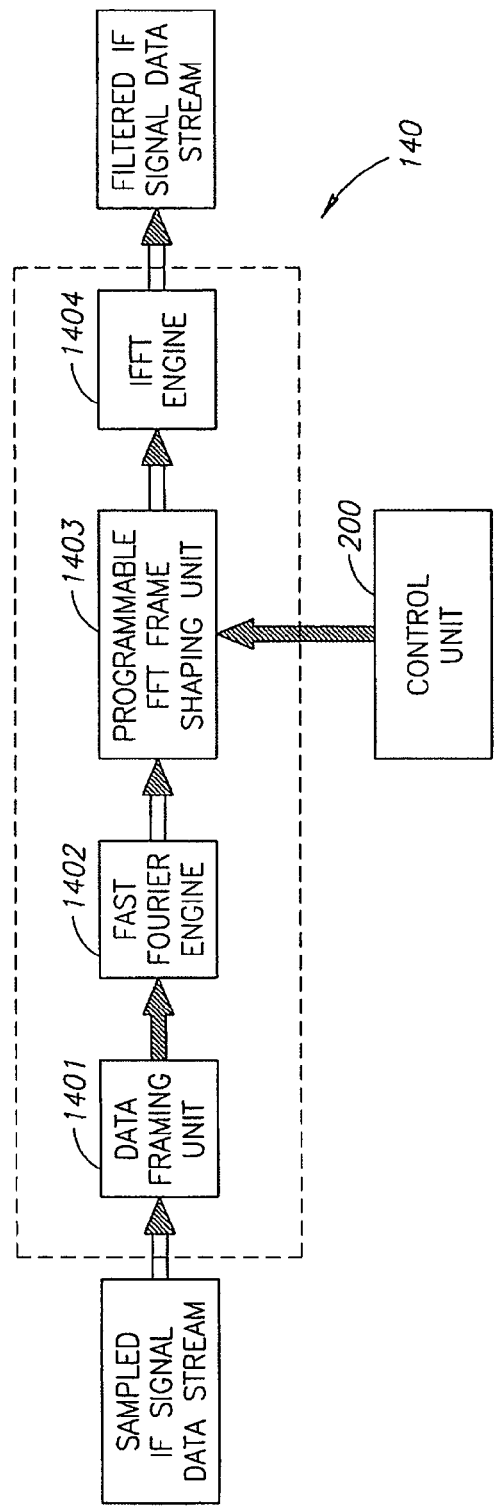
FIG. 6A is a block diagram of an alternative digital filtering configuration or block 140 incorporating a Fast Fourier Transform ("FFT"), programmable frame shaping, and an Inverse Fast Fourier Transform ("IFFT"), according to some embodiments of the present invention.
Figure 6B:
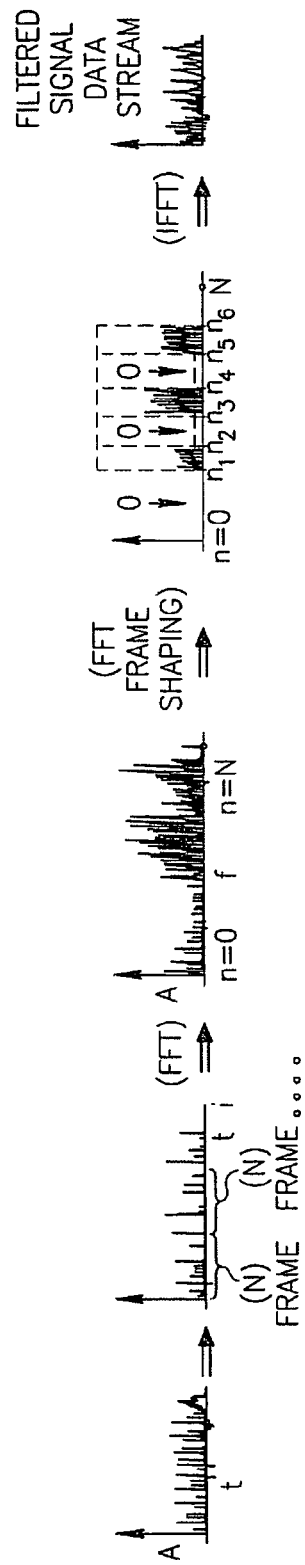
FIG. 6B is a series of time domain and spectral diagrams illustrating exemplary effects on a signal by each element in the digital filtering block of FIG. 6A.

Turning now to FIG. 6A, there is shown a block diagram of an alternative digital filtering block 140 where signal filtering may be accomplished using a Data Framing unit 1401, a spectrum analyzer (e.g., Fast Fourier Transform ("FFT") engine) 1402, a programmable frame shaping unit 1403, and an Inverse Fast Fourier Transform ("IFFT") engine 1404; and to FIG. 6B, which shows a series of time domain and spectral diagrams illustrating exemplary effects on a signal by each element in the digital filtering block of FIG. 6A.

According to the exemplary filtering system of FIG. 6A, a sampled data stream may be parsed by the Data Framing unit 1401 into individual frames of data. The frames may or may not partially overlap, and each frame may pass through a Fast Fourier Transform engine 1402, or some other time domain to frequency domain conversion block. Each frame of data output by the FFT engine 1402 may pass through a programmable FFT frame shaping block 1403. The frame shaping block may be programmed to suppress or notch out portions of the frame associated with undesired frequency components and to not affect or, optionally, to boost elements in the frame associated with frequencies of interest. The IFFT engine 1404 may be used to convert a frequency domain frame, which has passed through the frame shaping unit or block, back into a time domain frame. The frames may then be recombined into a digital data stream representing the original data stream in the time domain, but with unwanted frequency components removed and with wanted frequency components either untouched or enhanced. According to some embodiments of the present invention, the programmable FFT frame shaping unit 1403 may be programmed by a control unit 200. Removing unwanted frequency components may be done manually or automatically by the programmable FFT frame shaping unit in accordance with the instructions programmed into control unit 200. In addition, control unit 200 may include a modem that may enable remote access to remotely remove unwanted frequency components, or to remotely program control unit 200.

In contrast with the digital filtering configurations or blocks shown in FIGS. 3 and 5A, the filtering configuration of FIG. 6A may allow for the filtering of a large number of non-adjacent communication channels, e.g., of varying bandwidths and center frequencies, to be performed using, for example, three processing elements; namely, the FFT engine 1402, the programmable FFT frame shaping unit 1403, and the IFFT engine 1404. A further distinction between the two filtering methodologies lies in the fact that conventional digital filters operate purely in the time domain, while the filtering block of FIG. 6A converts a digital time domain signal into the frequency domain before stripping out or nullifying values corresponding to unwanted frequency components. Since the processes of converting a digital time domain signal into a frequency domain signal are generally computationally intense, and may thus introduce long delays, such processes have not been previously considered for real-time digital signal filtering. Such processes may be useful and worthwhile in the context of the present invention, e.g., in order to detect and/or identify recurring interference patterns off-line, so that such anticipated patterns may be subsequently taken into account as described above. The history of anticipated patterns that are detected and/or identified may be logged or stored in memory for later reference.

In accordance with some embodiments of the present invention the frequency domain conversion engine and the method to operate the engine may provide capabilities to monitoring the communication channel traffic and may enable to detect interferences characteristics. The data on the existing interference and its characteristic may provide an end user, for example a customer, with a tool to decide if the communication channel is damageable from the interference.

Figure 7:
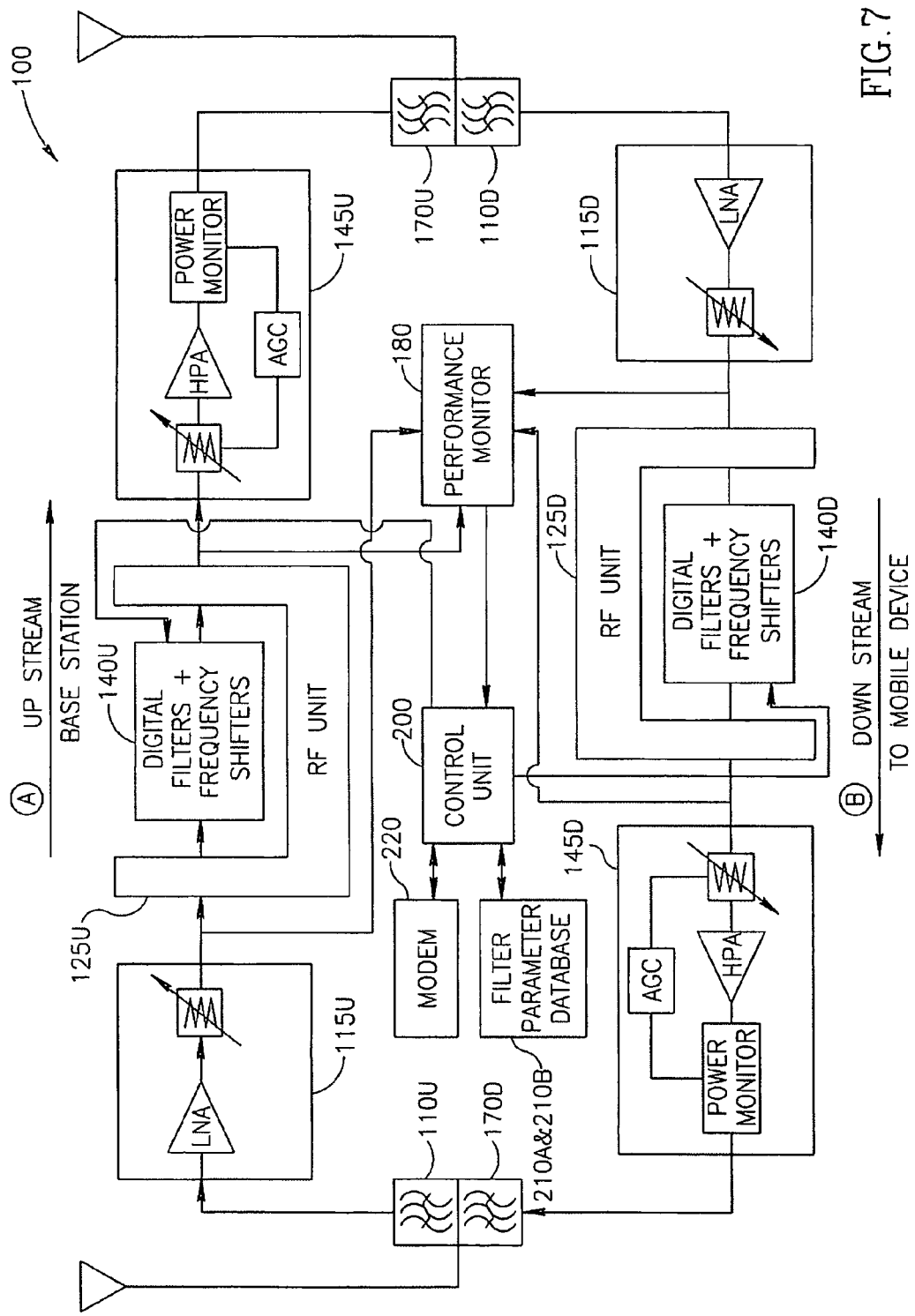
FIG. 7 is a block diagram showing another example of a bi-directional repeater with digital filters and digital frequency shifters according to some embodiments of the present invention, where digital filter and frequency shifting parameters may be adjusted and/or regulated.

Turning now to FIG. 7, there is shown another possible embodiment of a bi-directional repeater 100 according to the present invention. As in the bi-directional repeaters of FIGS. 2A and 2B, there are two sections; (A) an upstream or up-link section, and (B) a downstream or down-link section. Also, as in the embodiment of FIG. 2, the up-link and down-link sections may substantially mirror one another except for the frequencies they are tuned to pass and retransmit.

Looking at the downstream or down-link section (B) of the bi-directional repeater 100 of FIG. 7, there may be a duplexer including an input RF filter 110D. The input RF filter 110D may lead to a pre-filtering stage 115D which may include a low noise amplifier ("LNA") and an attenuator. The output of the pre-filtering block 115D may enter an RF unit 125D which may down convert the output and may also include an A/D converter. Digital filters and digital frequency shifters in a digital block 140D may be similar to the ones described for FIGS. 2A, 2B, 3 or 4A through 4C, or may include any other digital filters and digital frequency shifters suitable for the present invention. The output of the digital filter block 140D may enter the RF unit 125D, which may up convert the output and may also include a D/A converter. A power amplifier block 145D may include, for example, an attenuator, a high-power amplifier, and a power monitor. An automatic gain control circuit ("AGC") may adjust the attenuator such that the output signal from the power amplifier block 145D remains substantially steady. AGC may enable automated gain setting, automated gain balancing and/or automated oscillation protection. The output signal of the power amplifier block 145D may propagate to and through a duplexer including an output filter 170D.

As for the bi-directional repeater 100 in FIGS. 2A and 2B, the bi-directional repeater 100 of FIG. 7 may be configured to repeat specific sets of communication channels, at or around specific carrier/center frequencies, in the upstream direction, and/or to repeat specific sets of communication channels, at or around specific carrier frequencies, in the downstream direction. Digital filters and digital frequency shifters in the digital blocks 140U and 140D, may be adjusted to pass only frequencies at or around the carrier frequencies of the relevant communication channels. Frequency components of one or more communication channels may be shifted using a digital frequency shifter. Carrier frequency offsets due to up-conversion or down-conversion may be taken into account and compensated for within the digital filters. Furthermore, the bi-directional repeater 100 of the present invention may be adjusted to notch out narrow band noise interference(s) within the communication channels' frequency band.

Also shown in FIG. 7 is a performance monitor 180 connected to various points along the upstream and downstream signal paths. Monitor 180 may be used to track characteristics such as gain, time delay and phase across various elements of the repeater 100, including individual digital filters. Monitor 180 may transmit signals indicative of the monitored characteristics to a controller 200, which may make adjustments to various elements of repeater 100, including individual digital filters and frequency shifters 140U, in response to the monitor signal. Controller 200 may make changes to filter configuration and coefficients based on data stored in databases 210A and 210B and instruction or data received through modem 220. Performance monitoring data may be transmitted to a remote location via modem 220.

One of ordinary skill in the art should understand that the described invention may be used for various types of wireless or wire communication systems, including but not limited to a Tower Mounted Amplifier, wireless, wire, cable or fiber servers, e.g., where a narrow interference has to be filtered out, and/or where phase linearity and filter parameters have to be software programmable, and/or when the interference may occur in the communication channel.

Figure 9:
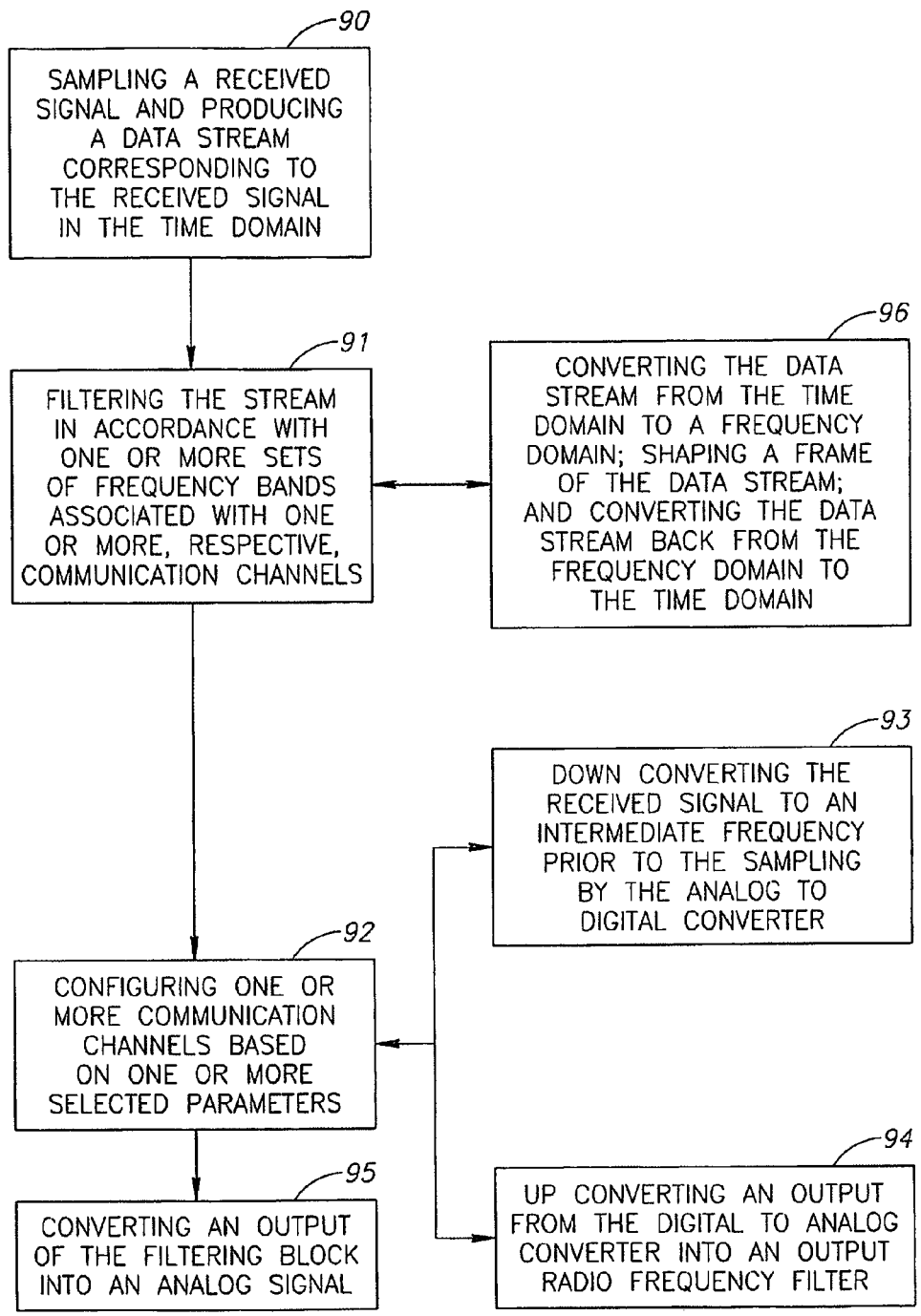
FIG. 9 is a flow chart describing a method of implementing digital filtering, according to some embodiments of the present invention.

According to some embodiments of the present invention, methods are provided for signal filtering. As can be seen with reference to FIG. 9, at block 90 a received signal may be sampled and a data stream corresponding to the received signal in the time domain may be produced. At block 91 the stream may be filtered in accordance with one or more sets of frequency bands associated with one or more, respective, communication channels. At block 92 one or more communication channels may be configured based on one or more selected parameters. The method may further include, at block 93, down converting the received signal to an intermediate frequency prior to the sampling by the analog to digital converter, and/or, at block 94, up converting an output from the digital to analog converter into an output radio frequency filter. At block 95 the method may include converting an output of the filtering block into an analog signal. In some embodiments the filtering may include, at block 96, converting the data stream from the time domain to a frequency domain; shaping a frame of the data stream; and converting the data stream back from the frequency domain to the time domain In additional embodiments the signal filtering method may include monitoring signal flow characteristics; indicating the signal flow characteristics to the controller; and reconfiguring one or more filtering elements if the signal flow characteristics are not within predefined ranges. In some embodiments the monitoring of the signal flow characteristics may include gaining a signal; delaying the signal; and shifting a phase of the signal. In some examples the monitoring includes transmitting the signal flow characteristics to a remote location via a modem.

In further embodiments the signal filtering method may include implementing automatic gain setting, implementing automatic gain balancing, and/or implementing oscillation control. In other embodiments the method may include analyzing a traffic load.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A signal filtering system comprising:
    an analog to digital converter adapted to sample a received signal and to produce a data stream corresponding to the received signal in the time domain;
    a digital signal processing unit to implement spectral analysis of said received signal;

a filtering sub-system to filter said data stream based on results of said spectral analysis, the filtering sub-system having one or more digital filter elements, each filtering element adapted to filter one or more sets of frequency bands associated with one or more, respective, communication channels;

a controller to configure said one or more digital filter elements based on one or more selected parameters; and a performance monitoring unit to monitor signal flow characteristics through the system and to indicate the signal flow characteristics to said controller, wherein said controller is adapted to reconfigure said one or more filtering elements if the signal flow characteristics are not within predefined ranges.

2. The signal filtering system according to claim 1, further comprising a down converter to down convert the received signal to an intermediate frequency prior to sampling by said analog to digital converter.

3. The signal filtering system according to claim 1, further comprising a down converter to down convert the received signal to a desired radio frequency prior to sampling by said analog to digital converter.

4. The signal filtering system according to claim 1, further comprising a digital to analog converter to convert an output of said filtering block to an analog signal.

5. The signal filtering system according to claim 1, further comprising an up converter adapted to up convert an output from said digital to analog converter into an output radio frequency filter.

6. The signal filtering system according to claim 1, wherein one or more of said filter elements include a programmable digital filter.

7. The signal filtering system according to claim 1, wherein one or more of said filter elements comprise a time domain to frequency domain conversion engine, a frame shaping unit, and a frequency domain to time domain conversion engine.

8. The signal filtering system according to claim 7, wherein said frequency domain conversion engine is a Fast Fourier Transform engine.

9. The signal filtering system according to claim 7, wherein said frequency domain to time domain conversion engine is an inverse Fast Fourier Transform engine.

10. The signal filtering system according to claim 1, wherein the monitored signal flow characteristics include at least one parameter selected from the group consisting of signal gain, signal delay, and signal phase shift.

11. The signal filtering system according to claim 1, wherein said controller is able to transmit said signal flow characteristics to a remote location.

12. The signal filtering system according to claim 11, wherein said controller is able to transmit said signal flow characteristics to said remote location via a modem.

13. The signal filtering system according to claim 1, comprising a gain control unit adapted to remotely reconfigure said one or more filtering elements if the signal flow characteristics are not within predefined ranges.

14. The signal filtering system according to claim 1, wherein said controller is adapted to automatically reconfigure said one or more filtering elements if the signal flow characteristics are not within predefined ranges.

15. The signal filtering system according to claim 1, wherein said controller is adapted to implement automatic gain control.

16. The signal filtering system according to claim 1, wherein said controller is adapted to automatically implement gain balancing.

17. The signal filtering system according to claim 1, wherein said controller is adapted to implement oscillation protection.

18. The signal filtering system according to claim 1, wherein said controller is adapted to analyze a traffic load.

19. The signal filtering system according to claim 1, wherein one or more of said filter elements are configured to pass one or more selected frequency bands.

20. The signal filtering system according to claim 1, wherein one or more of said filter elements are configured to block one or more selected frequency bands.

21. The signal filtering system according to claim 1, wherein one or more of said filter elements are configured to notch, at or around one or more selected frequency bands of an interference signal.

22. A method of signal filtering comprising:
sampling a received signal and producing a data stream corresponding to the received signal in the time domain;
filtering said stream in accordance with one or more sets of frequency bands associated with one or more, respective, communication channels;
configuring said one or more communication channels based on one or more selected parameters;
monitoring signal flow characteristics;
indicating the signal flow characteristics to said controller; and
reconfiguring said one or more filtering elements if the signal flow characteristics are not within predefined ranges.

23. The method according to claim 22, further comprising down converting the received signal to an intermediate frequency prior to the sampling.

24. The method according to claim 22, further comprising converting an output of said filtering into an analog signal.

25. The method according to claim 22, further comprising up converting an output of said converting into an output radio frequency filter.

26. The method according to claim 22, wherein filtering comprises:
converting said data stream from said time domain to a frequency domain;
shaping a frame of said data stream; and
converting the data stream back from said frequency domain to said time domain.

27. The method according to claim 22, wherein monitoring signal flow characteristics comprises:
gaining a signal;
delaying the signal; and
shifting a phase of the signal.

28. The method according to claim 22, wherein monitoring comprises transmitting the signal flow characteristics to a remote location.

29. The method according to claim 28, wherein transmitting the signal flow characteristics to a remote location comprises transmitting via a modem.

30. The method according to claim 22, further comprising implementing automatic gain setting.

31. The method according to claim 22, further comprising implementing automatic gain balancing.

32. The method according to claim 22, further comprising implementing oscillation control.

33. The method according to claim 22, further comprising automatically analyzing a traffic load.

34. A base station of a cellular communications system, said base station comprising:

an analog to digital converter adapted to sample a received signal and to produce a data stream corresponding to the received signal in the time domain;

a digital signal processing unit to implement spectral analysis of said received signal;

a filtering sub-system to filter said data stream, the filtering sub-system having one or more digital filter elements, each filtering element adapted to filter one or more sets of frequency bands associated with one or more, respective, communication channels;

a controller to configure said one or more digital filter elements based on one or more selected parameters; and a performance monitoring unit to monitor signal flow characteristics through the system and to indicate the signal flow characteristics to said controller, wherein said controller is adapted to reconfigure said one or more filtering elements if the signal flow characteristics are not within predefined ranges.

35. A repeater for a cellular communications system, said repeater comprising:

an analog to digital converter adapted to sample a received signal and to produce a data stream corresponding to the received signal in the time domain;

a digital signal processing unit to implement spectral analysis of said received signal;

a filtering sub-system to filter said data stream, the filtering sub-system having one or more digital filter elements, each filtering element adapted to filter one or more sets of frequency bands associated with one or more, respective, communication channels;

a controller to configure said one or more digital filter elements based on one or more selected parameters; and a performance monitoring unit to monitor signal flow characteristics through the system and to indicate the signal flow characteristics to said controller, wherein said controller is adapted to reconfigure said one or more filtering elements if the signal flow characteristics are not within predefined ranges.

* * * * *